United States Patent [19]

Brintle

[11] Patent Number: 5,629,039
[45] Date of Patent: May 13, 1997

[54] COOKING OIL EXTENDING PROCESS

[75] Inventor: B. Kelly Brintle, La Habra Heights, Calif.

[73] Assignee: Ventura Foods, LLC, City of Industry, Calif.

[21] Appl. No.: 488,831

[22] Filed: Jun. 8, 1995

[51] Int. Cl.$^6$ .................... A23L 1/00; C11B 3/00
[52] U.S. Cl. .................... 426/417; 210/DIG. 8; 426/438
[58] Field of Search .................... 426/417, 438; 99/408; 210/DIG. 8, 305, 167

[56] References Cited

U.S. PATENT DOCUMENTS

| | | | |
|---|---|---|---|
| 3,933,645 | 1/1976 | Keramidas | 210/305 |
| 4,489,646 | 12/1984 | Schmidt | 426/438 |
| 4,684,412 | 8/1987 | Fritzsche | 210/DIG. 8 |
| 5,452,648 | 9/1995 | Hohler et al. | 210/167 |

*Primary Examiner*—George Yeung
*Attorney, Agent, or Firm*—George W. Finch

[57] ABSTRACT

A fine mesh filter screen is used in the fry pot of a deep fat fryer to remove all but the finest loose food particles after every cooking cycle, which otherwise burn and shorten the life of the cooking oil.

13 Claims, 7 Drawing Sheets

COOKING OIL EXTENDING PROCESS

BACKGROUND OF THE INVENTION

Many food products served in retail restaurants are fried in cooking oil or shortening either at atmospheric or elevated pressures. Many of such food products, such as chicken, seafood or vegetables are breaded before being placed in hot oil for frying. The breading is usually a granular wheat product loosely bound to the food by moisture and egg albumin so a variety of particles thereof of different sizes tend to become unattached during the frying process. At first these pieces float, but after substantial moisture is cooked out of them, they sink, falling to the bottom of the fry pot of the fryer where they burn to discolor and impart a burnt taste to the oil. The burnt particles have also been implicated in early breakdown of the cooking oil. The burning occurs even when the fry pot is designed to have a cool sump because the action of frying causes turbulence that keeps the oil at near the same temperature throughout the fry pot. For this reason many commercial food fryers are equipped with an oil filter, which is used to remove the breading particles from the oil after a certain number of frying cycles, the actual number which depending on the type and characteristics of the breaded food being fried. In the worst instances, the filtering of the cooking oil must be accomplished every three to six frying cycles.

Generally filtering is performed with the oil at or near normal frying temperatures, although some filter systems require that the oil be cooled to almost room temperature because of the filtering agents used. Typical oil filtering systems include a drain valve attached to the lower surface of the fry pot. A filter pan is placed underneath the drain valve and the valve is opened. The hot oil then pours into the filter pan with the operator taking care to avoid splashing that can result in severe burns. Even when the operator is careful, splashing can occur, so it is preferred that the operator take the time to dress in protective clothing prior to the commencement of the filtering process. Such protective clothing commonly includes oil and heat resistant gloves, an oil and heat resistant apron, oil and heat resistant boots, and safety glasses.

Once the oil starts to drain, various scrappers and brushes are used to clean the sides of the fry pot and the electric heating element or gas flame tubes. When all of the cooking oil is drained and the fry pot is partially clean, the drain valve is closed and the hot oil is pumped back into fry pot until it is about ⅓ full. This clean oil is then used to thoroughly wash the sides of the fry pot, after which the oil is again drained and passed through the filter to remove any particles that might have been dislodged during the cleaning operation. The clean oil is then pumped back into the fry pot, with the operator taking care that the pump does not go dry and pump air, since when air is pumped through hot oil, the air causes the oil to oxidize and degrade very quickly. After multiple filterings, the number of which are dependent upon the filter and the product accumulating therein, the filter must be changed. Generally this is done after the oil has been pumped back into the fry pot and the filter has had an opportunity to cool. The whole filtering operation even in an highly automated food fryer can take as much as half an hour, during which time the fryer is out of production. In filtering systems where the oil must be cooled prior to filtering, the fryer may be out of use for as much as four hours.

In retail operations where the fryer is not used to its full frying capacity, and only one filtering process per day need be performed. The filtering process can be performed as the last job of the day (for hot oil filtering) or the first job of the day (for cool oil filtering). However, if there is a level and heavy demand for fried food during the business day, a extra fryer must be purchased and operated just to cover the filtering time, or more than the recommended number of batches must be fried between filterings. In any case, maximum production is limited by the filtering operation.

From the above, it should be apparent that it is highly desirable that the number of filtering operations be held to an absolute minimum, since such can be dangerous and reduce the production of fryers by a substantial margin. For example, if a fry cycle takes 15 minutes including time to load and unload, then at least every hour and a half the machine will be off line for half an hour while the oil is being filtered, resulting in a quarter of the time during the day being unavailable for frying.

If the oil is not filtered regularly, then instead of being replaced after approximately 60 fry loads, its useful life maybe reduced to as low as 20 loads. For a retail fried food operation, it is important to extend the life of the oil as long as possible, not only because of the acquisition cost of the oil, but also because the disposal of used cooking oil is difficult and expensive. In addition, the oil comes in heavy plastic containers, which also must be disposed of. Theoretically, in the case of a chicken fry operation, the oil should last until so much fat has been rendered from the chicken that the cooking oil begins to froth and foam, at which time, the oil must be replaced.

SUMMARY OF THE INVENTION

In the present invention, it has been discovered that a main reason for the early disposal of cooking oil, even if filtered conventionally on the normal schedule, is because the breaded particles that escape from the food product become overcooked and burnt during the fry cycles between filterings, imparting a burnt taste and a dark color to the fried product. If this burning of particles of breaded product could be eliminated, the oil could be used up to forty percent longer. The obvious solution would be to perform the filtering process after every fry load. However, such would result in fryer with a hot oil filter being unavailable up to two-thirds of the time during which its operation is needed and for cool oil filters, a restaurant would be fortunate to cook three loads a day.

The present invention provides a fine mesh pre-filter strategically placed in the fry pot, whose shape depends upon the shape of the fry pot and the operation of the particular frying machine. It has been discovered that contrary to common belief, the cooking effect of hot oil in a fry pot is not impeded by a fine mesh down to about 16 by 16 wires per inch of 0.018" wire. Such mesh size provides a very fine screen that traps all but the finest particles of breading that can be integrated with the normal large mesh fry basket either internally therein, there beneath, or in the case of a Henny Penny fryer, in its heat well. When the fry basket is removed, the fine mesh pre-filter screen can be quickly removed at the same time, the trapped particles therein shaken out, and be returned to the fry pot in thirty seconds or less. Since this time is less than normally required to fill the fry basket, the fine mesh pre-filter can be used without decreasing the production capacity of a fryer. When the fine mesh pre-filter is used to remove most of the volume of the particles after every fry, the oil tends to remain light in color, the taste of the fried product remains satisfactory for much more loads and the normal fines filter incorporated in modern frying machines, need be used on a much reduced schedule. The result is the oil lasts longer, the food tastes consistently better, and the production capacity of the fryer is increased, saving the operator from the need to have extra fryers. In the case of chicken frying or frying of other products that have fat, the limit on the lifetime of the oil is set by the leanness of the food pieces rather than the burning of the breading.

Therefore, it is an object of the present invention to provide a frying process that extends the life of cooking oil.

Another object is to reduce environmental pollution due to the disposal of used cooking oil and the plastic containers in which the cooking oil originally comes.

Another object is to increase the production capability of existing frying machines.

Another object is to improve the safety in retail frying operations by extending the period between which hot cooking oil must be drained out of a fry pot, filtered and then pumped back into the fry pot.

Another object is to reduce the number of times employees must waste time donning protective clothing.

These and other objects and advantages of the present invention will become apparent to those skilled in the art after considering the following detail specification together with accompanying drawings wherein:

DETAILED DESCRIPTION OF THE SHOWN EMBODIMENTS

Figure 1:
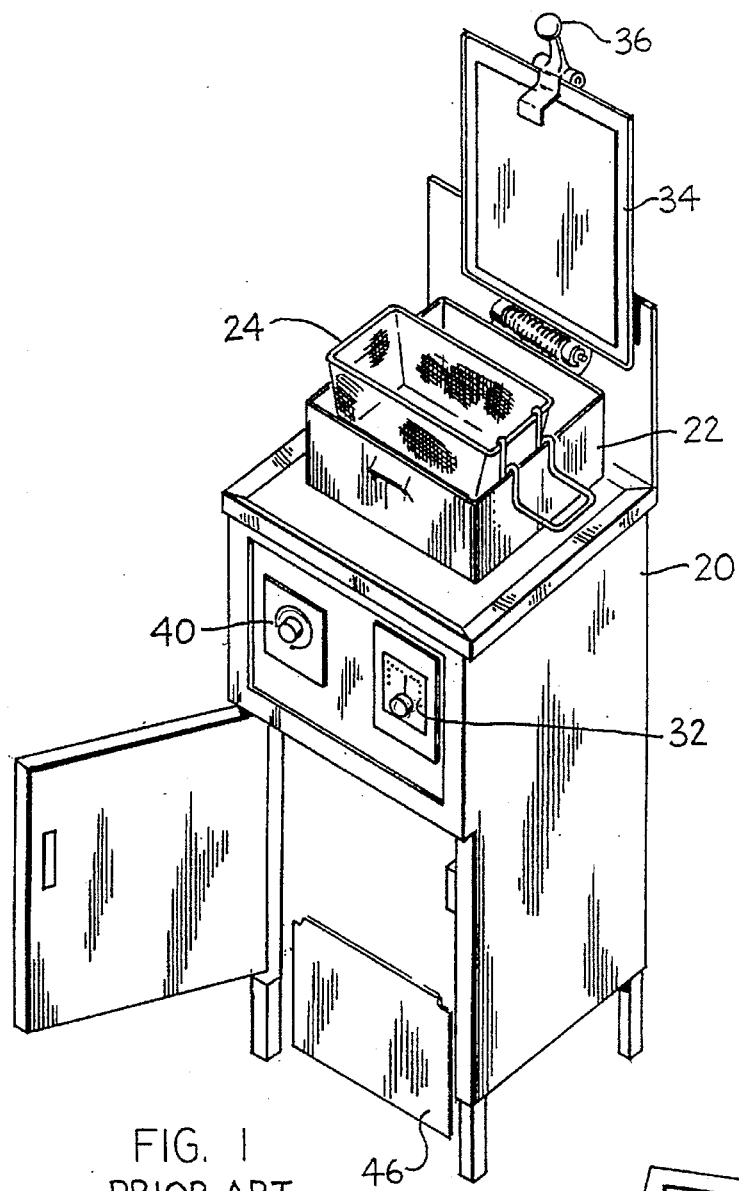
FIG. 1 is a perspective view of a Henny Penny pressure fryer as manufactured by the Henny Penny Corporation of Eaton, Ohio in an open condition.

Referring to the drawings more particularly by reference numbers, number 20 in FIG. 1 refers to a commercial deep fat fryer of the pressure type. Such fryers include a pressurizable fry pot 22 in which oil is heated for cooking. Fryers such as fryer 20 normally use gas or electricity as the heat source. The heat from burning gas is applied to the exterior of the fry pot 22, whereas electric fryers normally include resistance coils in the interior of the fry pot 22. A removable fry basket 24 is used to contain food to be fried within the fry pot 22. The basket 24 normally is manufactured from a large mesh stainless steel material.

Figure 2:
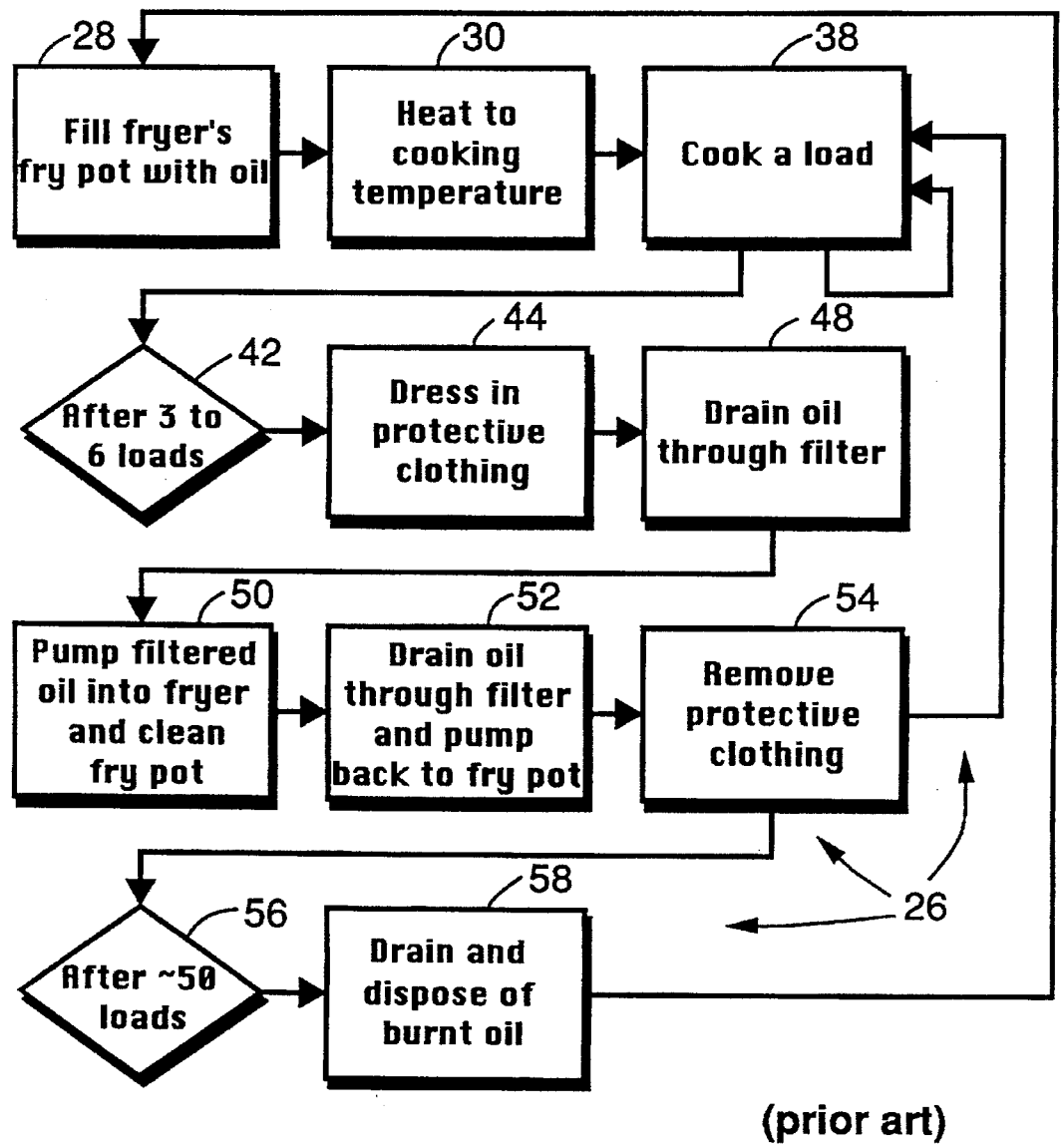
FIG. 2 is a block diagram of a typical prior art production frying process.

As shown in the block diagram 26 of FIG. 2, the first step in the use the fryer 20 is to fill its fry pot 22 with oil as stated in step 28. Then in step 30, heat is applied to the oil until it reaches proper cooking temperature, usually just over 300° F. The heat is supplied either by electric resistance coils within the fry pot or with gas burners (neither shown). Suitable controls 32 are provided for this purpose.

With a basket 24 lowered into the heated oil, pieces of food to be fried are placed in the basket 24. In the case of chicken, preferably the chicken pieces have had as much of the fat removed as is possible under the conditions of food preparation, after which the chicken pieces are rolled in a breading mix, which lightly adheres to the surfaces thereof. The larger pieces, such as breasts and thighs, are then placed in the hot oil within the fry basket 24, followed by the remaining pieces of chicken. This gives the thicker pieces of chicken a little bit longer to cook. Even when cooking similar sized pieces, it is preferable to place individual chicken pieces in the hot oil within the basket, rather than just filling the basket with chicken pieces and lowering them into the hot oil all at once because in such case, the chicken pieces can stick together or at least shield portions of each other from the hot oil, which results in light spots in the final fried product. The lid 34 is then closed and locked with a handle 36 so that pressure of about 2 atmospheres is created by the steam generated by the cooking chicken. When chicken is the product being cooked in step 38, the chicken pieces normally are cooked for about 10–12 minutes, during which time, some of the breading becomes dislodged from the chicken pieces. As the moisture is cooked out of the loose breading particles, they sink to the bottom of the fry pot 22 and over multiple cooking cycles, burn. When enough breading has accumulated and has been burnt, it imparts an undesirable taste to the oil which transfers to the cooking product. The burning of the loose breading also causes the oil to get darker, which in turn, causes the surface of the cooked food to become dark, which some customers find as an undesirable sign of overcooking.

A timer 40 is set at the time the lid 34 is closed. When the timer 40 reaches zero, the fryer 20 automatically depressurizes the fry pot 22 so that the handle 36 can be used to open the lid 34. The basket 24 with the chicken pieces retained therein is then removed from the fryer 20 and the chicken pieces are unloaded from the basket 24. The basket 24 is then put back in the hot oil and reloaded.

After three to six loads, as shown in step 42, the hot oil is filtered to remove the particles of breading. The hot oil is not filtered after every load since filtering of hot oil can take up to half an hour. Filtering takes that long because the operator doing the filtering, as shown in step 44, must dress in protective clothing including gloves, an apron, boots and safety goggles, since oil at about 300° F. can cause severe burns when splashed on bare skin. The hot oil is drained into a filter compartment 46, which is designed to remove essentially all of the breading particles from the oil. Unfortunately, since time constraints make such filtering undesirable, the number of loads between filtering is a compromise between fryer production and lifetime of the oil. In step 48, all of the oil in the fry pot 22 is filtered. Then (step 50) a portion of the filtered oil is pumped back up into the fry pot 22 and carefully used with insulated handle brushes (not shown) to scrub down the sides and other areas of the fry pot 22 onto which food particles can become lodged. This oil with its scrubbed off food particles is then cleaned by draining it through the filter before it is pumped back into the fry pot 22 in step 52. The operator then (step 54) removes the protective clothing and again performs step 38 to cook a load of food product. In as few as eight filtering cycles, the filter in the filter compartment 46 can become clogged, which requires additional time and expense to change or clean.

Usually after about 50 loads (step 56) the cooking oil has become dark and distasteful, so it is drained from the fry pot 22 and discarded (step 58). Normally an operator would try to arrange the frying operation so that step 58 is performed at the end of a workday with step 28 being performed first thing at the start of the next workday. However, in a high production operation, the normal result is either the fryer 20 is out of operation for a substantial time during the workday while the oil is changed, or the oil is changed too early or (most likely) too late.

Figure 3:
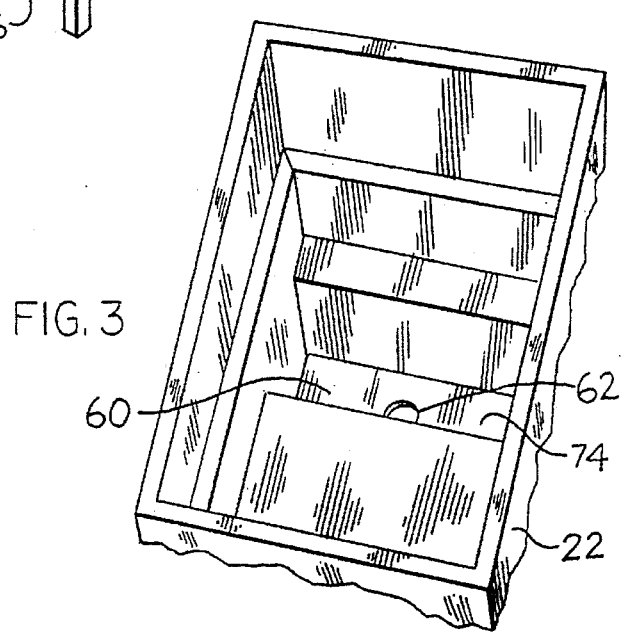
FIG. 3 is a perspective view of the interior of the fryer of FIG. 1 showing its heat well.
Figure 4:
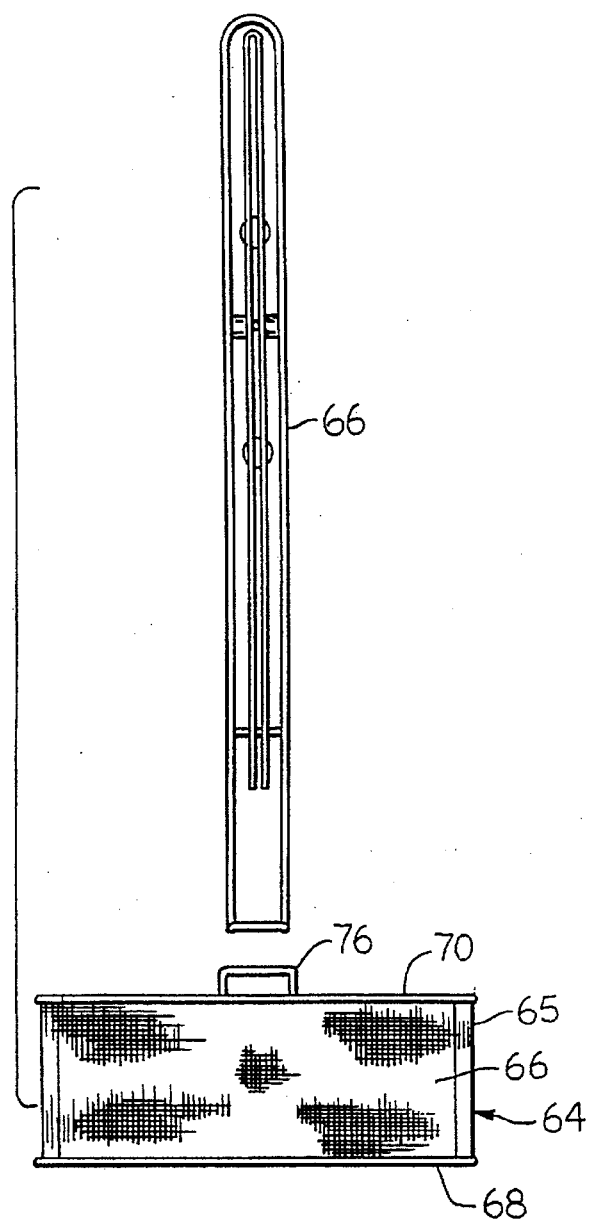
FIG. 4 is a front view of an auxiliary filter constructed according to the present invention for usage in the heat well of the fryer of FIGS. 3 and 4, including a removable handle therefore.
Figure 5:
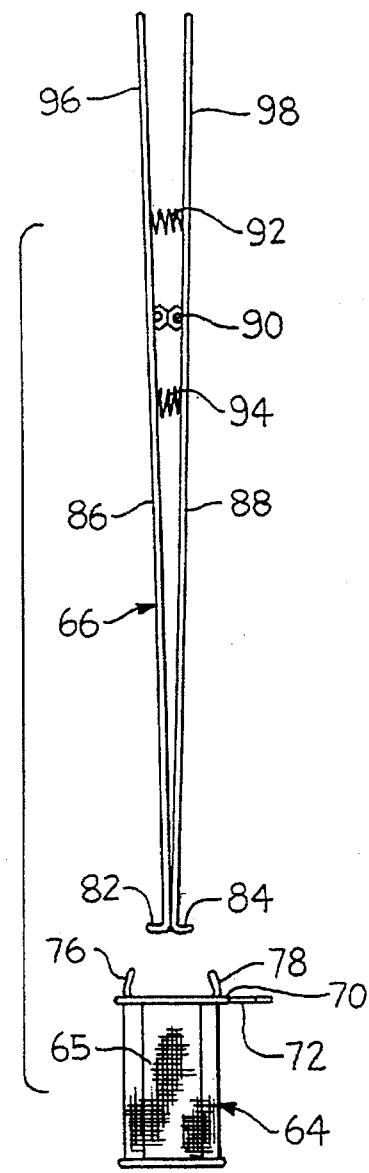
FIG. 5 is a side view of the auxiliary filter and handle of FIG. 5.

As shown in FIG. 3, the fry pot 22 of the Henny Penny fryer 20 includes a heat and drain well 60, the opening of the drain 62 being shown in the bottom of the well 60. The breaded particles that become loosened from the food product tend to collect and burn in the well 60. Therefore as shown in FIGS. 4 and 5, an auxiliary filter basket 64 having a fine screen 65 (16 by 16 per inch of 0.018 diameter wire) is positioned in the well 60 by means of a removable handle assembly 66. The fine screen 65 of that mesh size captures about half of the loose particles, but it captures about ninety five percent of their volume. It has been discovered that a screen 65 of larger mesh is not very effective in removing the particles, yet one of finer mesh begins to interfere with convective flows within the heated oil, which are required to uniformly distribute frying heat to the food product.

The auxiliary filter basket 64 is constructed with heavy gauge frame members 68 to maintain its shape. The upper edge 70 of the basket 64 includes a horizontal flat backstop 72 to assure clearance between the basket 64 and the bottom 74 of the heat well 60.

The basket 64 includes a pair of upstanding handles 76 and 78 attached across the upper edge 70 of the auxiliary filter basket 64 for engagement with horizontally extending tips 82 and 84 of the handle assembly 66. The handle assembly 66 includes two arm portions 86 and 88 that are connected together at a central pivot 90. At the preference of the user, a compression spring 92 can be mounted between the arm portions 86 and 88 above the pivot 90 to cause the arm portions 86 and 88 to tend to assume the position shown in FIGS. 4 and 5, or a compression spring 94 may be mounted below the pivot 90. In the first case, the user must squeeze the upper ends 96 and 98 of the arm portions 84 and 86 together so that the tips 82 and 84 engage the handles 76 and 78 whereas if spring 94 is used instead, the user must squeeze the upper ends 96 and 98 together to allow engagement of the tips 82 and 84 with the handles 86, the user then being able to relax once engagement has been accomplished.

Figure 6:
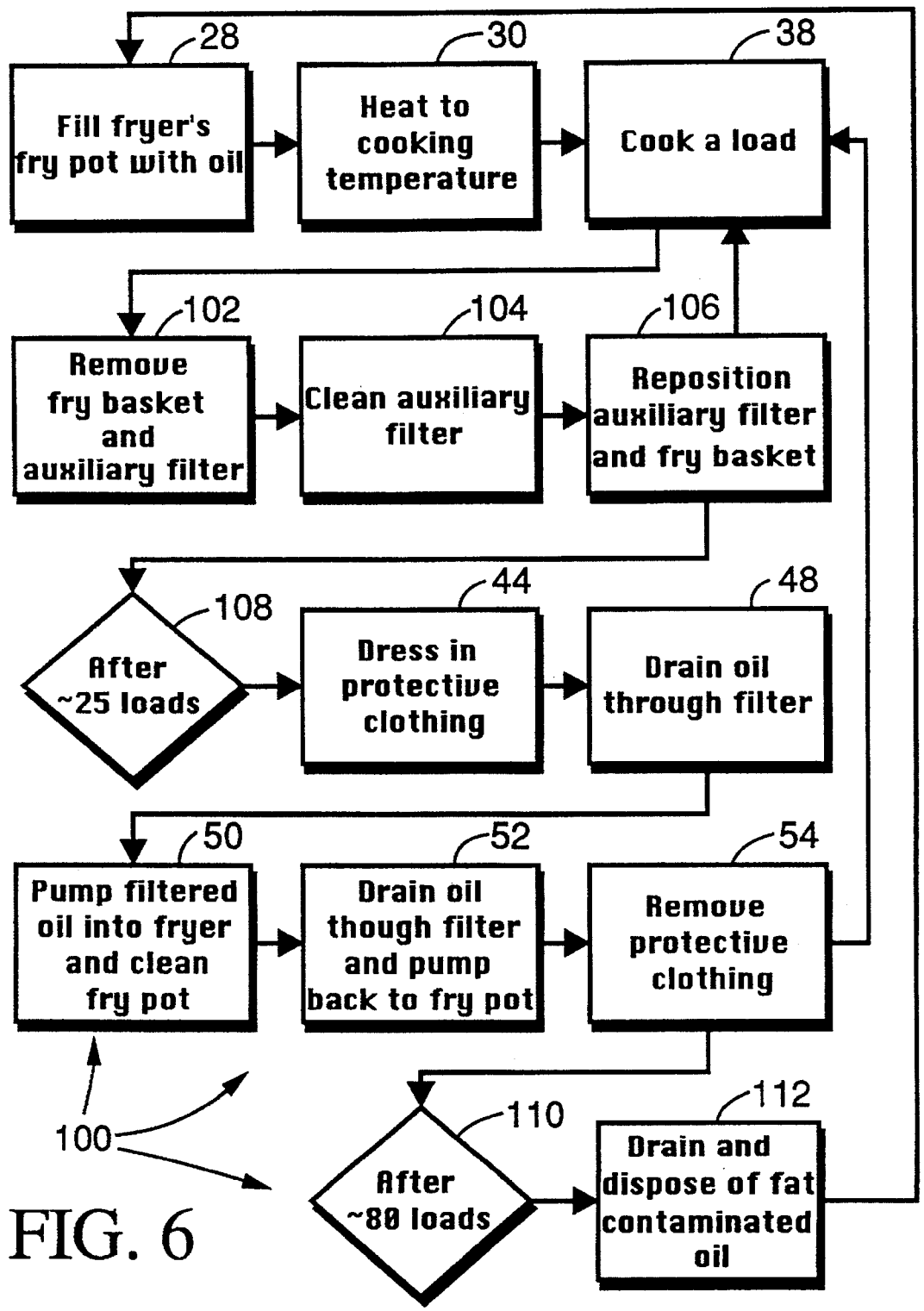
FIG. 6 is a block diagram of a production frying process using the present invention.
Figure 7:
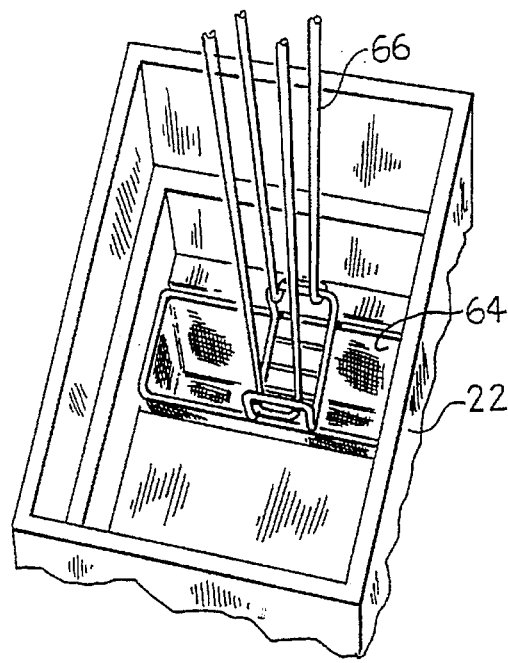
FIG. 7 is a view similar to FIG. 3 with the auxiliary filter installed in the heat well of the fryer.

As shown in the modified process block diagram 100 of FIG. 6 (step 102), the auxiliary filter basket 64 is removed from the heat well 60 preferably every time the fry basket 24 is removed to unload the fryer 20. The auxiliary filter basket 64 then cleaned by knocking the breaded particles away from the mesh screen 65, as shown in step 104. Then the basket 64 is repositioned (step 106) within the heat well before another load is cooked. Since burning of the particles can take more than two frying cycles, the cleaning of the auxiliary filter basket 64 can be put off to every other frying cycle. However, if cleaning of the basket 64 is put off beyond two cycles, the oil can be adversely affected. Also, if multiple employees are operating the fryer, it can be difficult to keep track of an "every other cycle" or "every third cycle" basket cleaning.

The fine mesh auxiliary filter basket 64 is so effective in removing all but the tiniest of particles, known as fines, that instead of requiring filtering after three to six loads as in step 42, such filtering can be put off for approximately 25 loads. This greatly increases the production capability of the fryer 20, since steps 102, 104 and 106 can be performed in as little as 30 seconds or even faster if two filter baskets 64 are used alternatively for each fryer 20. Since only the very fine particles are removed from the oil by the internal filter of the fryer 20, the filter can last 80 loads or more as shown in step 110.

In a side-by-side test, when the basket 64 was not used, after forty eight loads and eight filter cycles, it took three minutes, twenty-six seconds for a fry pot of hot oil to pass through a Henny Penny filter. When the basket 64 was used under the same frying conditions, one minute and thirty seconds was required for the same amount of hot oil to pass through the filter, which is very close to the time required for the hot oil to pass through a new filter. When the filter basket 64 is used, usually the oil is discarded (step 112) only after it has been contaminated by the rendering of fat, when chicken is the food product, or breaks down because of exposure to frying temperatures over about one hundred fifty hours.

Figure 8:
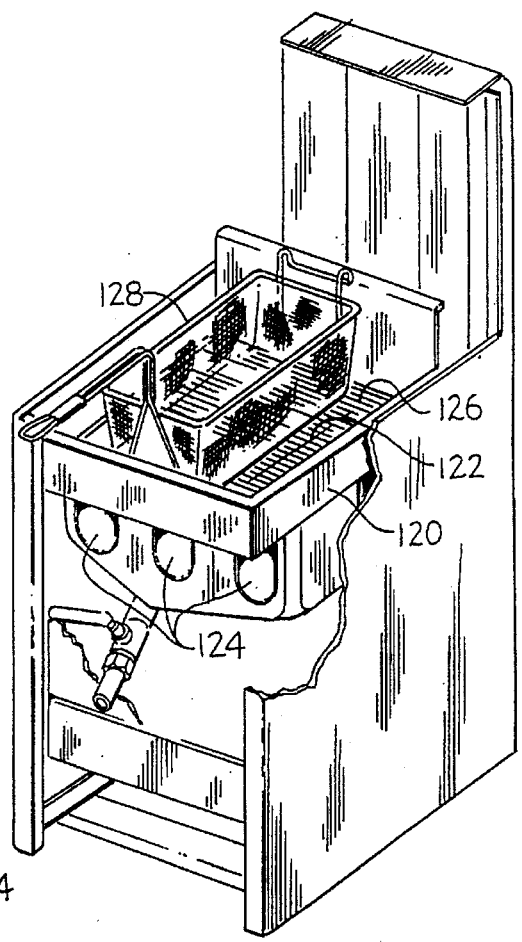
FIG. 8 is partially cutaway perspective view of a Keating gas fryer as manufactured by Keating of Chicago of Bellwood, Ill.
Figure 9:
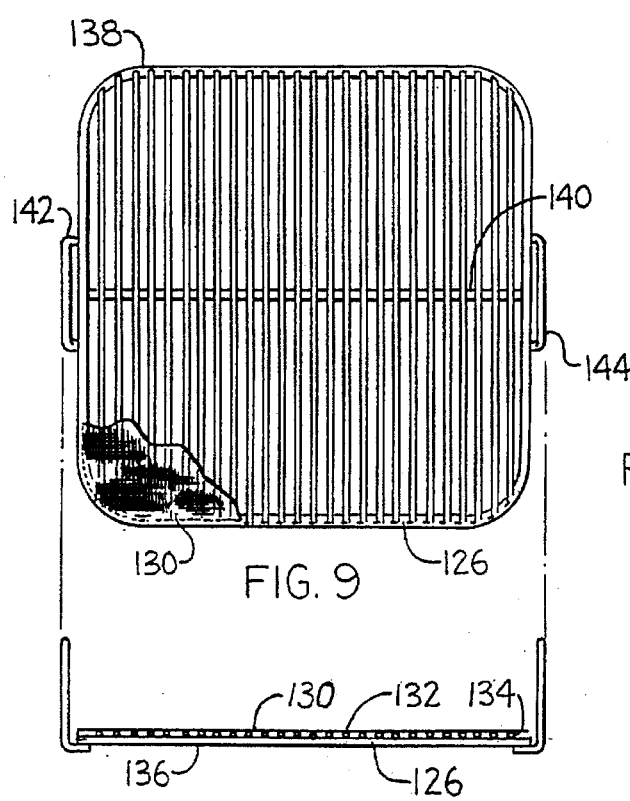
FIG. 9 is a top plan view of an internal grating of the fryer of FIG. 8 modified into an auxiliary filter of the present invention.
Figure 10:
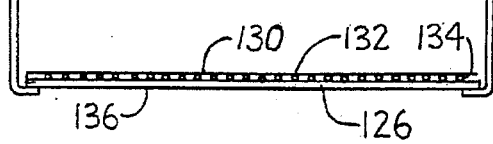
FIG. 10 is a side view of the auxiliary filter of FIG. 9.
Figure 11:
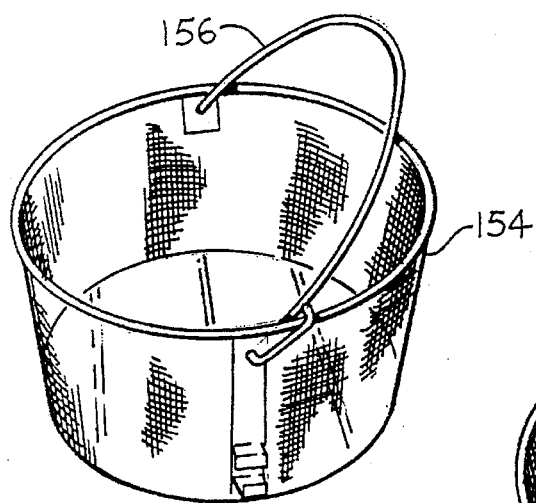
FIG. 11 is a perspective view of the fry basket of a Fry King electric pressure fryer manufactured by Barbecue King Industries.
Figure 12:
FIG. 12 is a perspective view of an auxiliary filter constructed in accordance with the present invention for fitting inside the fry basket of the fryer of FIG. 11.
Figure 13:
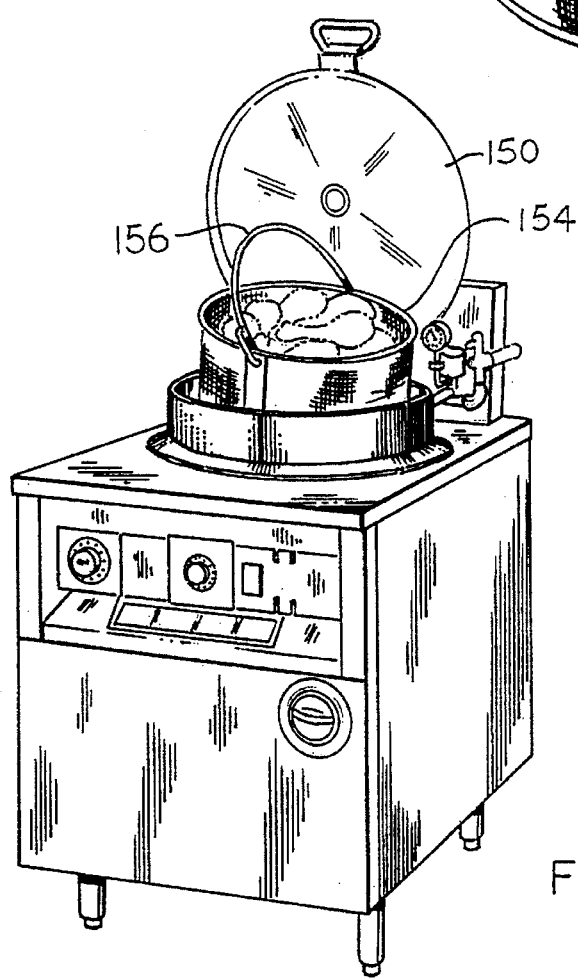
FIG. 13 is a perspective view of a Fry King electric pressure fryer incorporating a cylindrical fry pot and fry basket.

Essentially the same process may be used with commercial fryers of various configurations. For example in FIG. 8, which shows a Keating gas fryer 120, the fry pot 122 is generally shallow having a plurality of heat tubes 124 extending across the bottom thereof. The Keating fryer 120 normally employs a grate 126 that rests on the tubes 124. The grate 126 prevents food product that somehow has escaped the frying basket 128, from becoming lodged down beneath the tubes 124, which in many instances would otherwise require draining of the oil and cooling of the fryer 120 to remove. In the case of the Keating fryer 120, the fine mesh screen 130 is placed on top of the grate 126, as shown in FIGS. 9 and 10. Although the screen 130 is shown extending over the upper surfaces 132 of the cross rods 134, the screen instead can be extended across the bottom surface of the support ring 138 and center support 140 of the grate 126. Detachable handle assemblies (not shown) similar to those shown in FIGS. 4 and 5 may be used to remove the grate 126 after every fry load by engagement with the support ring 138. Otherwise, the grate can include permanent handles 142 and 144 placed to the side so as not to interfere with manipulation of the frying baskets 128. A fine screen auxiliary filter may be shaped to fit inside the fry basket 128, such as shown in FIGS. 11 and 12 for a Barbecue King fryer 150 as shown in FIG. 13. The auxiliary filter basket 152 for the fryer 150 is constructed from fine mesh that is shaped to fit inside the generally cylindrical fry basket 154 used therewith. In the case of the fryer 150, the basket 154, with the auxiliary filter 152 contained therein and food products within them both, is removed from the fryer 150 through use of the basket handle 156. Once the food product has been removed, the filter basket 152 is removed from the interior of the fry basket 154, cleaned and reinstalled.

Figure 14:
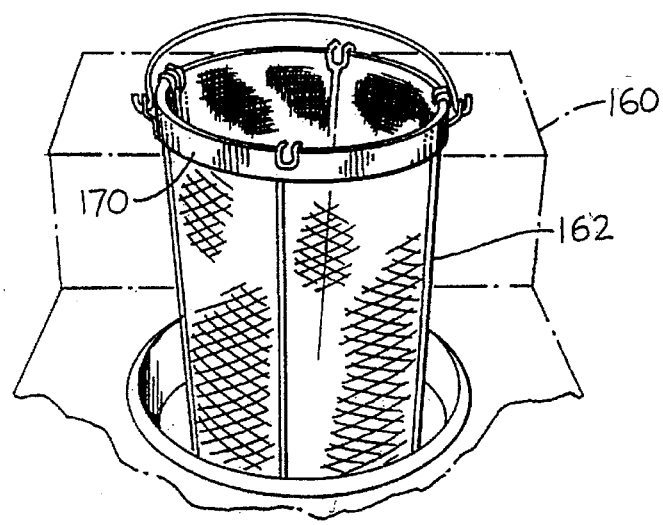
FIG. 14 is a perspective view of a portion of a Chester pressure fryer manufactured by Barbecue King Industries incorporating a cylindrical fry pot and fry basket.
Figure 15:
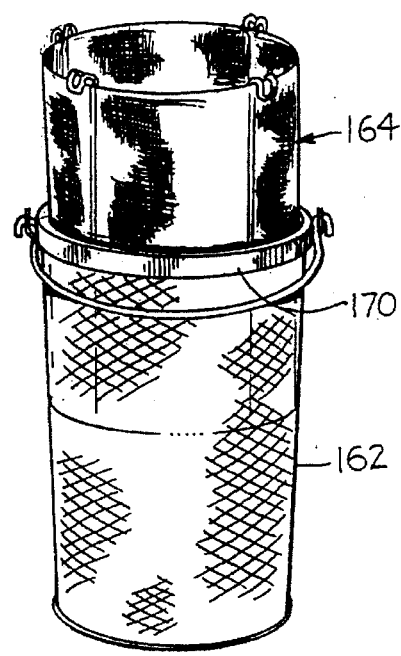
FIG. 15 is a perspective view of the fry basket of a Chester fryer with an auxiliary filter of the present invention being inserted therein.
Figure 16:
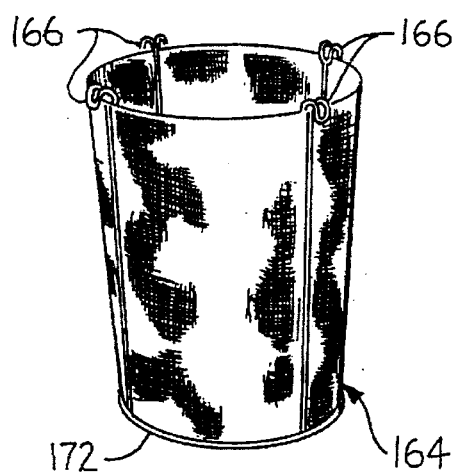
FIG. 16 is a perspective view of the auxiliary filter of FIG. 15.

In the case of the Chester fryer 160, shown in FIG. 14, which uses a long narrow frying basket 162 (FIG. 15), the auxiliary filter 164 (FIG. 16) constructed as the others before described, includes a plurality of hooks 166 at its upper ring edge 168. The basket 162 includes a metal ring 170 constructed to retain the basket 162 in a cylindrical condition with which the hooks 166 engage. The hooks 166 are desirable for use with long thin filter baskets 164, which otherwise might deform and jam inside the cooking basket 162 if supported by their bottom edge 172.

Thus there has been shown and described a novel process and apparatuses useful in extending the life of cooking oil and increasing the production capability of preexisting commercial deep fat fryers which fulfill all objects and advantages sought therefore. Many changes, alterations, modifications and other uses and applications of the subject process and apparatus will become apparent to those skilled art after considering the specification together with the accompanying drawings. All such changes, alterations and modifications which do not depart from the spirit and scope of the invention are deemed to be covered by the invention, which is limited only by the claims with that follow.

I claim:

1. A process for extending the life of cooking oil in a fry pot of a deep fat fryer used for cooking breaded food products including the steps of:

(a) placing a fine mesh screen in the fry pot of the deep fat fryer;

(b) placing breaded food product retained by a frying basket in the fry pot of hot oil to fry the food product;

(c) removing the breaded food product from contact with the hot oil; and (d) removing the fine mesh screen with particles of breading that have separated from the breaded food product that will not pass through the fine mesh screen and therefore are retained thereby, before the particles of breading can burn.

2. The process as defined in claim 1 wherein the fry pot has a heat well in the bottom thereof, step (a) including:

placing a fine mesh screen basket shaped to fit closely in the heat well, in the heat well.

3. The process as defined in claim 1 wherein the deep fat fryer used for cooking breaded food products includes a frying basket for retaining breaded food product through which breading from the breaded food product and hot oil can pass and wherein step (a) includes:

placing a screen basket having a fine mesh that is capable of retaining breading from the breaded food product in the frying basket so that the breaded food product is retained by both the frying basket and the screen basket while breading that becomes loose from the breaded food product is retained by the screen basket.

4. The process as defined in claim 1 wherein step (a) includes:

placing a grate with a fine mesh screen beneath the frying basket.

5. The process as defined in claim 1 wherein the fine mesh screen is constructed to allow hot oil to convectively flow therethrough at least as easily as hot oil convectively flows through a 16 by 16 per inch 0.018" wire mesh screen.

6. The process as defined in claim 1 including the step of:

filtering the oil after about twenty five repetitions of step (b) to remove fine particles of breading that are able to pass through the fine mesh screen.

7. The process as defined in claim 1 including after step (d), the steps of:

(e) cleaning particles of breading from the fine mesh screen; and (f) repeating steps (a) through (c).

8. A process of steps for increasing the production of a deep fat fryer used for cooking breaded food products, the fryer including a fry pot and a filter, by increasing the life of cooking oil in the fry pot of the fryer and increasing the number of loads that can be cooked before the oil must be filtered, including the steps of:

(a) placing a fine mesh screen in the fry pot of the deep fat fryer where particles of breading that have separated from the breaded food product are trapped thereby;

(b) removing the fine mesh screen with the trapped particles of breading before the particles of breading can burn and adversely affect the cooking oil;

(c) cleaning the trapped particles of breading from the fine mesh screen; and (d) repeating steps (a) through (c) so that the filter of the fryer needs be used only occasionally and the oil needs only be replaced due to causes other than the burning of particles of breading therein.

9. The process as defined in claim 8 wherein the fry pot has a heat well in the bottom thereof, step (a) including:

placing a fine mesh screen basket shaped to fit closely in the heat well, in the heat well.

10. The process as defined in claim 8 wherein step (a) includes:

placing a frying basket fitting fine mesh screen basket in the frying basket so that the breaded food product is retained by both the frying basket and the fine mesh basket.

11. The process as defined in claim 8 wherein step (a) includes:

placing a grate with a fine mesh screen beneath the frying basket.

12. The process as defined in claim 8 wherein the fine mesh screen is constructed to allow hot oil to convectively flow therethrough at least as easily as hot oil convectively flows through a 16 by 16 per inch 0.018" wire mesh screen.

13. The process as defined in claim 8 including the step of: filtering the oil through the filter after about twenty five repetitions of step (b) to remove fine particles of breading that are able to pass through the fine mesh screen.

* * * * *